(12) United States Patent
Saliba (10) Patent No.: US 11,868,212 B2
(45) Date of Patent: Jan. 9, 2024

(54) METHOD AND DEVICE FOR IDENTIFYING AN APPLICATION TYPE OF UNKNOWN DATA

(71) Applicant: Magnet Forensics Investco Inc., Waterloo (CA)

(72) Inventor: Jad John Saliba, Waterloo (CA)

(73) Assignee: Magnet Forensics Investco Inc., Waterloo (CA)

(*) Notice: Subject to any disclaimer, the term of this patent is extended or adjusted under 35 U.S.C. 154(b) by 26 days.

(21) Appl. No.: 17/554,581

(22) Filed: Dec. 17, 2021

(65) Prior Publication Data

US 2022/0107868 A1    Apr. 7, 2022

Related U.S. Application Data

(63) Continuation of application No. 14/498,325, filed on Sep. 26, 2014, now abandoned.

(60) Provisional application No. 61/883,279, filed on Sep. 27, 2013.

(51) Int. Cl.
  *G06F 11/14*    (2006.01)
  *G06F 16/25*    (2019.01)

(52) U.S. Cl.
  CPC ........ *G06F 11/1402* (2013.01); *G06F 16/252* (2019.01)

(58) Field of Classification Search
  None
  See application file for complete search history.

(56) References Cited

U.S. PATENT DOCUMENTS

| | | | | |
|---|---|---|---|---|
| 5,956,725 A * | 9/1999 | Burroughs | ............ | G06F 16/289 707/999.1 |
| 6,070,539 A * | 6/2000 | Flamme | ............... | A01M 7/0089 701/50 |
| 2002/0013817 A1* | 1/2002 | Collins | ................ | G06Q 10/107 709/206 |
| 2003/0050935 A1* | 3/2003 | Spetsmann | ........ | G06F 16/24573 707/999.107 |
| 2010/0318489 A1* | 12/2010 | De Barros | .......... | G06F 21/6254 707/E17.045 |
| 2014/0258341 A1* | 9/2014 | Mazoue | ................ | G06F 16/211 707/803 |

* cited by examiner

*Primary Examiner* — Kannan Shanmugasundaram
(74) *Attorney, Agent, or Firm* — Own Innovation Inc.; James W. Hinton; Kent Howe (57) ABSTRACT

The present embodiments relate generally to a computer device, system and method of identifying an application type of unknown data. The method may include: determining that the unknown data corresponds to database information, the database information comprising at least one table with at least one column; for a column of a table in the database information, determining if a column identifier of the column comprises a keyword associated with a particular application type; and if the column identifier comprises the keyword, identifying data stored in the database as belonging to an application that is of the particular application type.

16 Claims, 6 Drawing Sheets

| Table Name: Messages (134) | | | | |
|---|---|---|---|---|
| Message_id (312) | Author_id (314) | Conversation_id (316) | text (318) | timestamp (320) |
| 11482714 (362) | g:1101816.... (364) | 1 (366) | hey hey hey (368) | 2013-04-29.... (370) |

METHOD AND DEVICE FOR IDENTIFYING AN APPLICATION TYPE OF UNKNOWN DATA

RELATED APPLICATIONS

This application is a continuation of U.S. patent application Ser. No. 14/498,325, filed Sep. 26, 2014, which claims the benefit of U.S. Provisional Patent Application Ser. No. 61/883,279, filed Sep. 27, 2013, the entire contents of which are hereby incorporated by reference herein for all purposes.

FIELD

Embodiments herein relate to methods, systems and devices for identifying an application type of unknown data, and in particular to methods, systems and devices for identifying an application type of unknown data stored on a computer readable medium such as, for example, a storage device.

INTRODUCTION

Computing devices (e.g., desktop or laptop computers, and mobile devices such as smartphones or tablet computers) typically contain one or more computer readable media (e.g., memory, a hard disk drive, or a solid state drive) on which applications can store data.

In various situations, it may be desirable to recover data from the computer readable media. For example, data recovery may be performed when there is a failure of the computer readable media that prevents normal access to the data.

Data recovery may also be performed in the context of forensics. For example, a user may attempt to hide, delete, or obfuscate data on a computer readable medium so that the data may not be readily accessible to someone else. This may be particularly the case where the user is undertaking some illicit or otherwise improper activity and does not want such activity to be discovered. In such scenarios, law enforcement authorities or others may be interested to learn about a user's activities on a particular computing device by recovering data on that computing device.

In a further example, data recovery may be performed to allow a party to know how a computing device had been or is being used by a given individual or a group of individuals. For example, employers may be interested to learn how their computer resources are being used by their employees. Similarly, parents and/or spouses might be interested to know how members of their families are using a computing device.

SUMMARY OF SOME EMBODIMENTS

According to some aspects, there is provided a method of identifying an application type of unknown data, the method comprising: determining that the unknown data corresponds to database information, the database information comprising at least one table with at least one column; for a column of a table in the database information, determining if a column identifier of the column comprises a keyword associated with a particular application type; and if the column identifier comprises the keyword, identifying data stored in the database as belonging to an application that is of the particular application type.

In various embodiments, the keyword is associated with a data field that is commonly used by an application of the particular application type.

In various embodiments, the method includes sampling a data record in the table; and determining that data for the column in the data record is consistent with data for the data field that would belong to an application of the particular application type In various embodiments, the method includes converting the data in the column in the data record to each of a plurality of date/time formats; comparing the converted data, in each respective date/time format, to each other to determine which converted data is closest to a reference date/time; and for the converted data that is closest to the reference date/time, identifying the date/time format of the converted data as the date/time format of the data in the column of the table.

In various embodiments, the method includes storing a mapping between the data field and the column, the mapping being accessible during recovery of data in the database to indicate that data for the column in the table is associated with the data field.

In various embodiments, the method includes displaying the mapping between the data field and the column in a user interface, wherein the user interface provides an option to select an alternative column of the table to be mapped to the data field; receiving input indicating that the data field is to be mapped to the alternative column; and storing an updated mapping for the data field, the updated mapping indicating that the data field is mapped to the alternative column.

In various embodiments, the particular application type can include a messaging application, and the data field that is commonly used comprises one of: a sender field, a recipient field, a message field, and a timestamp field.

In various embodiments, the particular application type can include a web browser application, and the data field that is commonly used comprises one of: an address field, a date field, a bookmark field, and a title field.

In various embodiments, the particular application type can include a geographic location-enabled application, and the data field that is commonly used comprises one of: a longitude field, a latitude field, a destination field, a direction field, and a route field.

In various embodiments, the particular application type comprises a messaging application, and the keyword comprises one of the following words: message, subject, text, msg, body, content, date, time, timestamp, from, sender, author, uid, member, to, receiver, conversation, recipient, partner, participant, and party.

In various embodiments, the particular application type comprises a web browser application, and the keyword comprises one of the following words: address, location, loc, URL, visited, date, bookmark, favorite and title.

In various embodiments, the particular application type comprises a geographic location-enabled application, and the keyword comprises one of the following words: coordinate, longitude, latitude, location, loc, home, destination, direction, and route.

According to some other aspects, there is provided a computing device comprising a processor and a memory storing instructions which, when executed by the processor, cause the processor to perform the methods described herein.

According to some other aspects, there is provided a computer readable medium comprising instructions which, when executed by a processor, cause the processor to perform the methods described herein. In various embodiments, the computer readable medium is non-transitory.

According to some other aspects, there is provided a system adapted to perform any one or more of the methods as described herein.

According to some other aspects, there is provided a device comprising at least one processor adapted to perform any one or more of the methods as described herein.

DRAWINGS

Some embodiments will now be described, by way of example only, with reference to the following drawings, in which.

DESCRIPTION OF VARIOUS EMBODIMENTS

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments.

The embodiments of the methods described herein may be implemented in hardware or software, or a combination of both. In some cases, embodiments may be implemented in one or more computer programs executing on one or more programmable computing devices comprising at least one processor (e.g., a microprocessor), a data storage device (including in some cases volatile and non-volatile memory and/or data storage elements), at least one input device, and at least one output device. For example and without limitation, the programmable computing devices may be a personal computer, laptop, personal data assistant, cellular telephone, smartphone device, tablet computer, and/or wireless device. Program code is applied to input data to perform the functions described herein and generate output information. The output information is applied to one or more output devices.

In some embodiments, each program may be implemented in a high level procedural or object oriented programming and/or scripting language. However, the programs can be implemented in assembly or machine language, f desired. In any case, the language may be a compiled or interpreted language.

In some embodiments, the computing devices and methods as described herein may also be implemented as a transitory or non-transitory computer-readable storage medium configured with a computer program, wherein the storage medium so configured causes a computing device to operate in a specific and predefined manner to perform at least some of the functions as described herein. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Moreover, the subject system may be implemented as one or more software components stored on one or more computer servers that are accessible via one or more client machines in a client-server architecture. In such case, the system can be considered to be a hosted software offering or a software service in a software-as-a-service deployment.

The embodiments of the present disclosure relate generally to methods of identifying an application type of unknown data that may be encountered during a data recovery process. In traditional data recovery processes, there is typically a catalog of application data that indicates the data format of data stored by a given application on a storage device. When unknown data is encountered, this application data is referenced to determine if the unknown data matches the data formats that are indicative of a particular application. If so, the unknown data is processed according to the identified application.

Such traditional processes, however, may be inefficient because they require analysis of the data structure stored by an application before data associated with the application can be recovered. As computer technology advances and becomes more prevalent, applications for electronic devices are being developed at an increasingly fast rate. In particular, as mobile device applications have become more popular, the number and variety of applications available to users of mobile devices has expanded dramatically. The ever-growing number of applications makes analyzing the data format of each application difficult. This results in data formats for many applications not being analyzed. If data stored by these applications are encountered during data recovery, such traditional data recovery processes may not be able to adequately recover the data.

At least some of the present embodiments may provide a computing device, system or method that allows unknown data (which does not already correspond to a data format of a known application) to still nevertheless be recovered.

Viewed at a high-level, according to the teachings herein, various embodiments may recognize that even though the particular data format for an unanalyzed application may be unknown, the application type of the unanalyzed application may be identified based on certain characteristics of how unknown data is stored. In particular, some embodiments may recognize that certain keywords may be commonly used by applications of a particular application type as an identifier for a column of a table stored in a database.

Additionally, some embodiments may recognize that these keywords are being used to identify a column that may indicate that the data for the column corresponds to a common data field stored by applications of the application type. For example, the keywords "author" or "from" may be commonly used in chat or instant messaging (IM) type applications to identify a "sender" data field for chat messages stored in the application.

Figure 1:
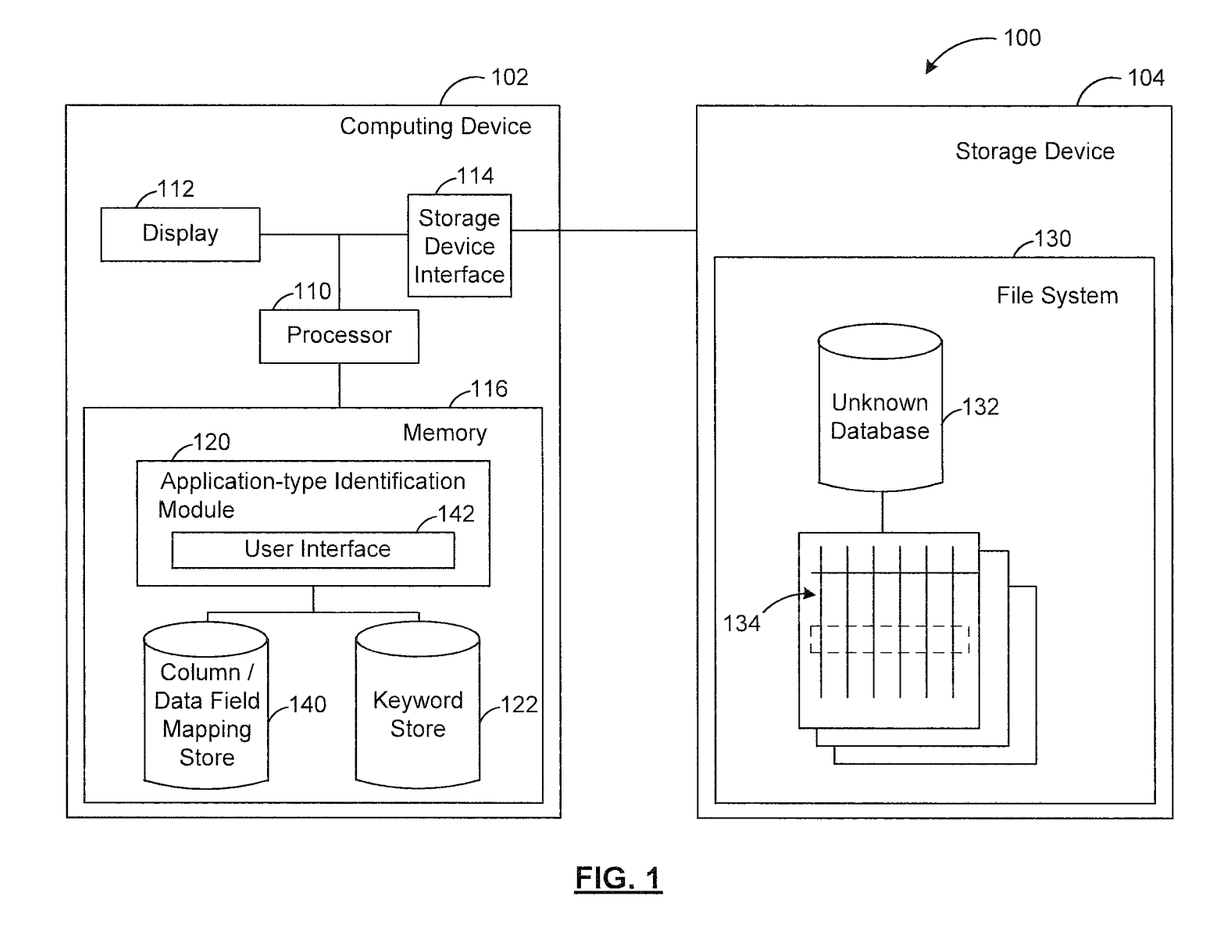
FIG. 1 is a schematic diagram illustrating a computing device for identifying an application type of unknown data stored in a storage device, in accordance with one example embodiment.

Referring now to FIG. 1, illustrated therein generally as 100 is a block diagram showing a computing device for identifying an application type of unknown data stored in a storage device in accordance with one example embodiment. As shown, a computing device 102 may be coupled to a storage device 104 on which the unknown data is stored. The computing device 102 may include a processor 110, a display 112, a storage device interface 114, and a memory 116.

Processor 110 may be configured to perform the steps of the methods described herein. To perform these steps, in various embodiments, the processor 110 may execute instructions stored on memory 116. For example, the instructions may be stored in the form of an application-type identification module 120.

During execution, the application-type identification module 120 may be configured to retrieve keywords from a keyword store 122, with the keywords being used to analyze the column identifiers of an unknown database 132 stored on the storage device 104 to determine if the data stored therein corresponds to a particular application-type. For ease of illustration, the keyword store 122 is shown as being also stored on memory 116. However, it will be understood that the keyword store 122 may be stored separately from the memory 116 (e.g., on a hard disk (not shown) or some other local or remote storage).

As is discussed in greater detail below, if it is determined that a column identifier includes a keyword associated with an application type, a mapping may be stored between the column and a data field that is commonly used by applications of the application type. These mappings may be stored in the column/data field mapping store 140. In some cases, the initial or a previous mapping determined by the presence of the keywords may be subsequently updated through a user interface 142 provided by the application-type identification module 120.

Figure 5:
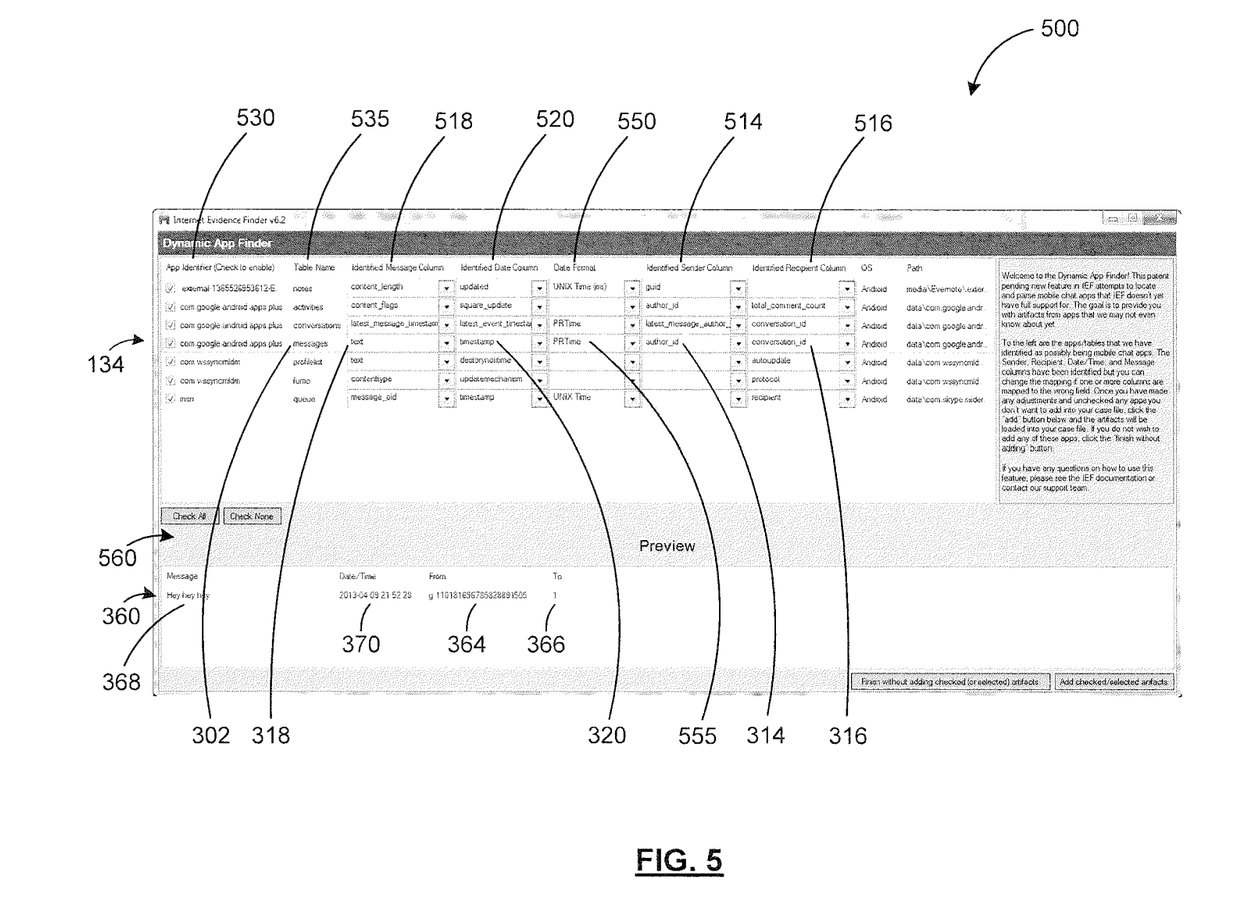
FIG. 5 is a screenshot of an example user interface that allows updating of the mapping of a column of a table to a data field commonly used by an application of a particular application type, in accordance with one example embodiment.
Figure 6:
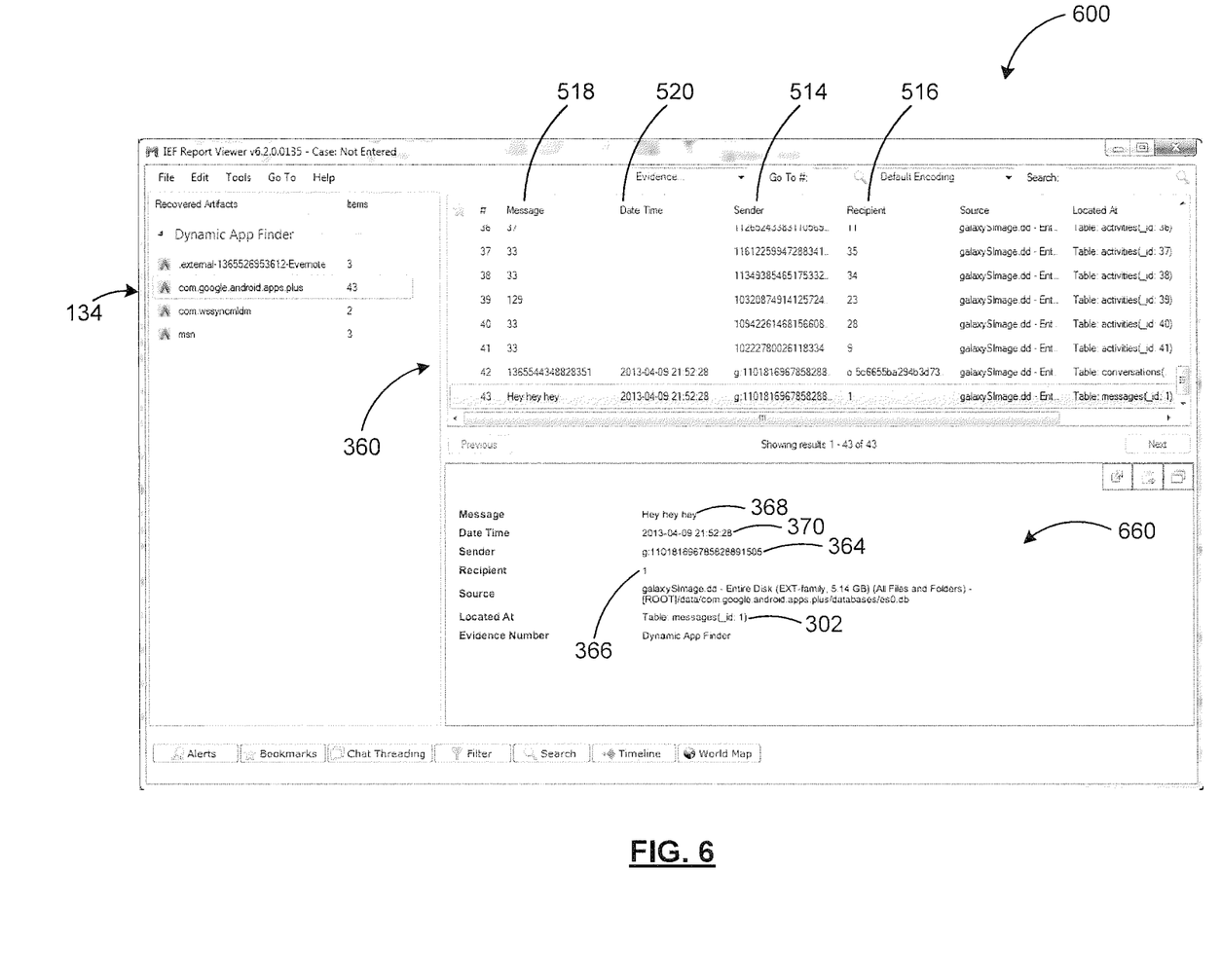
FIG. 6 is a screenshot of a data recovery user interface after the updating of the mapping of a column of a table to a data field commonly used by an application of a particular application type, in accordance with one example embodiment.

In various embodiments, the user interface 142 may be displayed on display 112. Display 112, for example, may be a suitable display device (e.g. a monitor, screen or touchscreen) coupled to the processor 110. The user interface 142 may allow the processor 110 to solicit input from a user that may confirm or update the mapping of a column to a data field, as stored in the column/data field mapping store 140 of memory 116. Examples screenshots that may be shown in the user interface 142 are illustrated in FIGS. 5 and 6, and will be discussed in greater detail below.

The storage device 104 may be coupled to computing device 102 through storage device interface 114. The storage device 104 may have application data stored thereon associated with various known and unknown applications. In various embodiments, the storage device 104 may include a file system 130 that contains a number of different files. In some situations, one or more of the files 130 may correspond to unknown database information stored in a database 132. At least some of the present embodiments are directed to methods of determining if the data stored within an unknown database 132 includes data that is of a particular application type, e.g., by determining if column identifiers for a database table 134 of the unknown database 132 includes certain keywords.

It will be understood that in certain situations, a data recovery process may attempt to analyze data that is intended to have been deleted from the storage device 104 (e.g., if data recovery is being performed in a forensics context by law enforcement officers). For example, a user may use the "delete" function of an operating system to delete a file, but such file may nevertheless still be recoverable despite having been "deleted". This is because many operating systems and/or device driver software may not physically delete the data from the storage device 104 immediately when a command to delete such data is received. Instead, the addresses on the storage device 104 that stores such data may simply be marked as "unallocated" or "available". Such indications inform the operating system or other applications that these addresses are now available to store other data, so that the old data may subsequently be overwritten and thereby deleted when there are new data stored in such addresses. Since such data may not actually be overwritten, it is possible that the data flagged to be deleted may remain physically undeleted from the storage device 104 for an extended period of time even though it had been requested to be deleted by the application or the user (or both).

Accordingly, when analyzing the data that is stored on a storage device 104 in the present embodiments, it is possible that the data being analyzed is intended to have been deleted, but nevertheless remains readable from the storage device 104.

It will be understood that the different components shown in FIG. 1 can be provided in a variety of ways. For example, the computing device 102 may be provided in the form of personal computers, networked computers, portable computers, portable electronic devices, personal digital assistants, laptops, desktops, mobile phones, smart phones, tablets, and so on.

The processor 110 may be any type of processor, such as, for example, any type of general-purpose microprocessor or microcontroller, a digital signal processing (DSP) processor, an application-specific integrated circuit (ASIC), a programmable read-only memory (PROM), or any combination thereof.

Similarly, the memory 116 may include any type of computer memory that is located either internally or externally to the computing device 150 such as, for example, random-access memory (RAM), read-only memory (ROM), compact disc read-only memory (CDROM), electro-optical memory, magneto-optical memory, erasable programmable read-only memory (EPROM), electrically-erasable programmable read-only memory (EEPROM), a hard disk drive, a solid-state drive or any other form of suitable computer readable medium that may be used in electronic devices.

Additionally, computing device 102 may include one or more input devices (not shown), such as a keyboard, mouse, camera, touch screen and/or a microphone, and may also include one or more output devices such as a display screen 112 and/or a speaker. Computing device 102 may have a network interface for connecting to a network (not shown) in order to communicate with other components.

It will be understood that although each of data stores 122, 140 are illustrated in FIG. 1 separately, they can be stored together as separate tables within the same or multiple databases both locally and/or remotely. Additionally, other persistent storage methods such as encrypted files may also be used to provide persistent storage.

Further, the storage device interface 114 of the computing device 102 may be any type of hardware or software interface that allows the computing device to communicate with the storage device 104. For example, the storage device interface 114 may be one or more of the following interfaces: Parallel AT Attachment (PATA), Serial AT Attachment (SATA), Integrated Drive Electronics (IDE), Enhanced Integrated Drive Electronics (EIDE), Small Computer System Interface (SCSI), Universal Serial Bus (any version), FireWire and/or Thunderbolt. Additionally or alternatively, the storage device interface 114 may allow communication with a storage device 114 which is provided remotely (e.g., via Network-Attached Storage (NAS) and/or Storage Area Network (SAN) mechanisms) by acting as a client to a server that provides access to the storage device 104.

Moreover, the storage device 104 on which the unknown data is stored may include any type of the computer readable media that is to be the subject of the data analysis methods described herein, including the types of memory that are listed above as being options for the memory 116.

Figure 2:
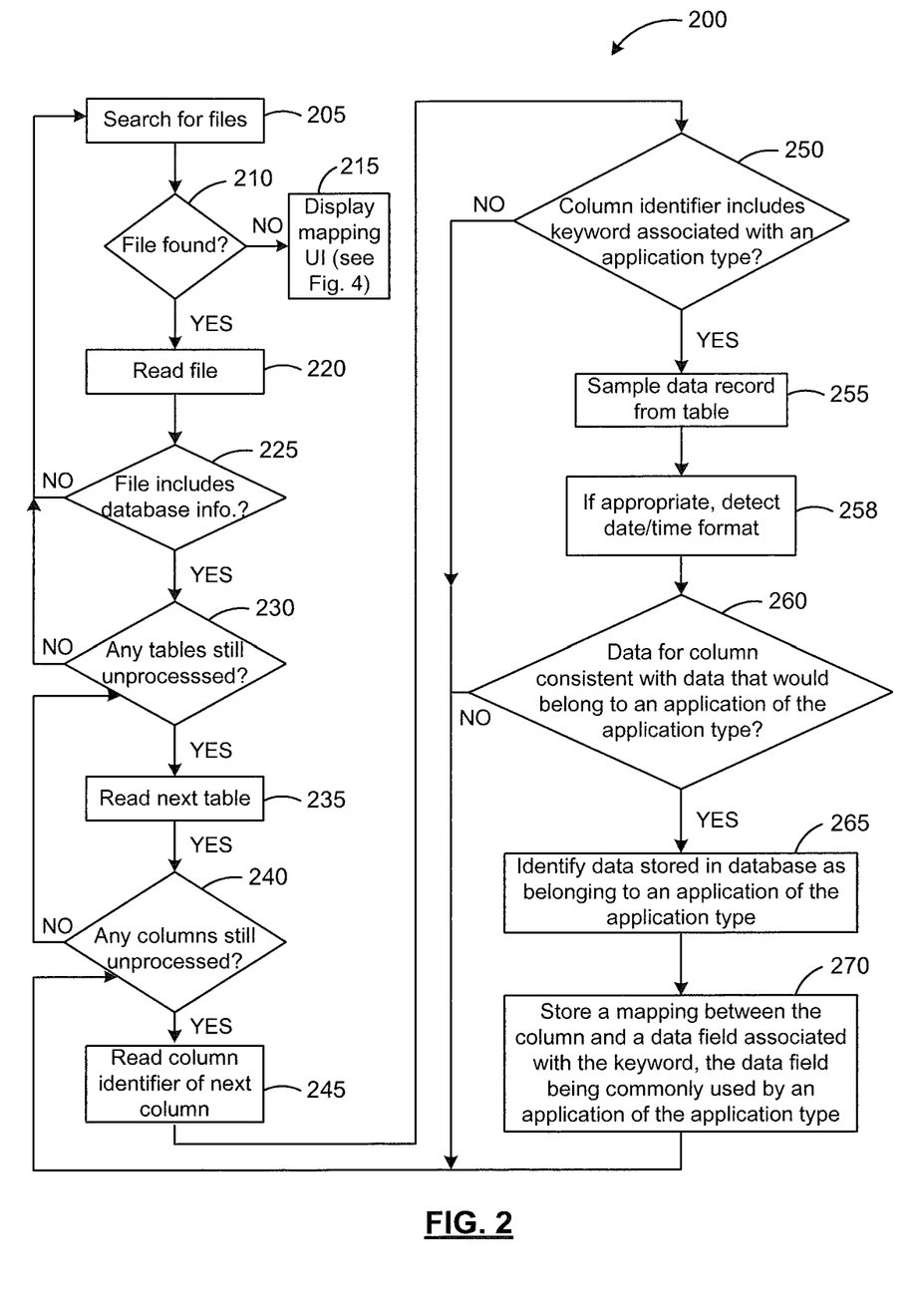
FIG. 2 is a flowchart illustrating a method for identifying an application type of unknown data stored in a storage device, in accordance with one example embodiment.

Referring now to FIG. 2, shown there generally as 200 is a method for identifying an application type of unknown data stored in a storage device, in accordance with one example embodiment. In some embodiments, the components of the computing device 102, such as the processor 110, may be configured to execute one or more steps of the method 200 to identify an application type of unknown data. For ease of explanation, when discussing various steps of the method of FIG. 2, reference will simultaneously be made to an example database table shown generally as 134 in FIG. 3.

Figure 4:
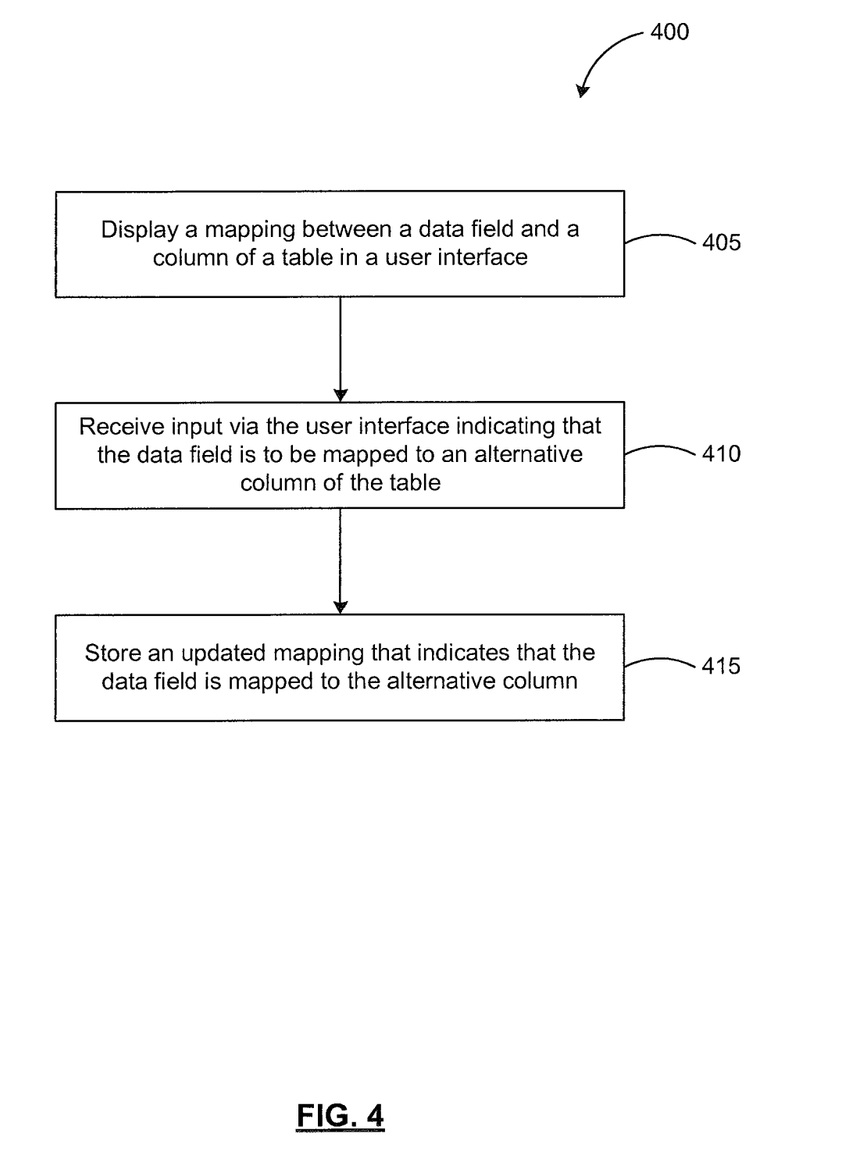
FIG. 4 is a flowchart illustrating a method for updating the mapping of a column of a table to a data field commonly used by an application of a particular application type, in accordance with one example embodiment.

At step 205, a search for files of the storage device 104 is initiated. The storage device 104 may be formatted according to a known file system that the application type identification module 120 (as shown in FIG. 1) is configured to access and conduct a search on. For example, the storage device 104 may have been formatted for use with various operating systems such as Microsoft™ Windows™, Linux™, Apple OS X™, Apple iOS™ and/or Android™, and the file systems that can be processed by the application-type identification module 120 may include the following file systems: File Allocation Table 32 (FAT32), New Technology File System (NTFS), third extended file system (ext3), fourth extended file system (ext4), Hierarchical File System (HFS) and/or Hierarchical File System Plus (HFS+ or HFSX), At step 210, it is determined whether a file has been found. If no file has been filed (the 'NO' branch at step 210), then there may be no remaining files to be processed by method 200. If at least one of the located files were determined to contain database information and also resulted in at least one mapping between a column and a data field, method 200 may then proceed to display the mapping user interface at step 215. As noted, computing device 102 may display the mapping user interface via display 112 (as shown in FIG. 1). As will be discussed below, the mapping user interface may allow a user using the computing device 102 to confirm or alter the mapping between a column and a data field determined by the method of FIG. 2. The steps associated with providing such a user interface are shown in FIG. 4.

It may be the case that the file system 130 is not recognized by the application-type identification module 120, or that no database information has been located on the file system 130, or that no mappings between data fields have been generated. In such case, step 215 may not be performed. The process may then end and a message may be displayed that indicates that the method of FIG. 2 was not able to identify the application type of the data stored on the storage device 104.

If it is determined that a file has been found (the 'YES' branch at 210), the computing device 102 may open the file for read access and the data in the file may be read to attempt to determine if the file includes database information (step 220).

At step 225, a determination is made as to whether the file corresponds to database information. This may be performed, for example, by reading the header information for a file to determine if it contains information indicating that it is of a known database type. For example, this step may involve checking for the string "SQLite format 3" in the header information of the file as SQLite database files typically includes the text "SQLite format 3" in its header. In some cases, the information indicating that a file is a database may not necessarily be within the header portion of a file and instead, could be located in other parts of the data associated with the file. For example, the file extension of a file may indicate that a file is of a particular database type (e.g., the file extensions ".mdb", ".mda", or ".accdb" may indicate that the given file is a Microsoft™ Access™ database). It will be appreciated that the determination made at step 225 may identify database information that does not necessarily include the entire contents of a given database. For example, the database information may include any portion of the contents of a database (e.g., as may be the case if the remaining contents of the database have already been overwritten or is otherwise unavailable).

If the file is determined not to include database information (the 'NO' branch at step 225), then method 200 returns to step 205 where it may again begin the process of determining whether there are any files remaining to be processed. In various embodiments, the application-type identification module 120 may also store data to a report database (not shown) indicating that the previous file was processed and had been identified as not containing a database.

If the file is determined to include database information (the 'YES' branch at step 225), then the tables accessible within the database are processed and method 200 proceeds to step 230.

At step 230, the method 200 determines if there are any tables that are still unprocessed in the database. If there are not (the 'NO' branch at step 230), then the method 200 returns to step 205 where it may again begin the process of determining whether there are any files remaining on the storage device 104 to be processed. If there are still tables to be processed (the 'YES' branch at step 230), then the next table in the database information is read at step 235.

At step 240, it is determined if there are any columns of the table that are still unprocessed. If there are not (the 'NO' branch at step 240), then the table has been processed and method 200 returns to step 230 to determine whether the database information contains any further tables that are still unprocessed.

If it is determined that there are columns of the table still to be processed (the 'YES' branch at 240), then the column identifier of the next column is read at step 245. In some cases, the column identifier may be the name of the column used in a database. In various embodiments, the column identifier information may be retrieved from the schema of the database. In some cases, the column identifier may be found in header data of the database table, however the column identifier could also be located in other parts of the data associated with the column.

Once the identifier of a column has been read, step 250 determines whether the column identifier read at step 245 includes a keyword associated with a particular application type. For example, in the case where the column identifier is a column name, this step may involve determining if the column names include keywords that are commonly used as column names by applications of the particular application type. The presence of such keywords in the column name may be taken as an indication that the database belongs to an application of that particular application type.

As examples, the present embodiments may be able to determine that unknown data is of an application type that includes, without limitation: a chat or instant messaging application type, a web browser application type, a navigation/geo-location application type, a file sharing application type, a social networking application type, a cloud application type, and an email application type. It will be understood that although specific example application types are mentioned and described herein for illustrative purposes, the present embodiments may be used to identify any application type generally.

Some examples of keywords that may be used to identify data as belonging to an application of a chat or instant messaging application type may include the words: 'message', 'subject', 'text', 'msg', 'body', 'content', 'date', 'time', 'timestamp', 'from', 'sender', 'author', 'uid', 'member', 'to', 'receiver', 'conversation', 'recipient', 'partner', 'participant', and 'party'. Some examples of keywords that may be used to identify data as belonging to an application as belonging to an application of a web browser type may include the words: 'address', 'location', 'loc', 'URL', 'visited', 'date', 'bookmark', 'favorite' and 'title'. Some examples of keywords that may be used to identify data as belonging to an application of a navigation/geographic-location application type include: 'coordinate', 'longitude', 'latitude', 'location', 'loc', 'home', 'destination', 'direction', and 'route'.

Figure 3:
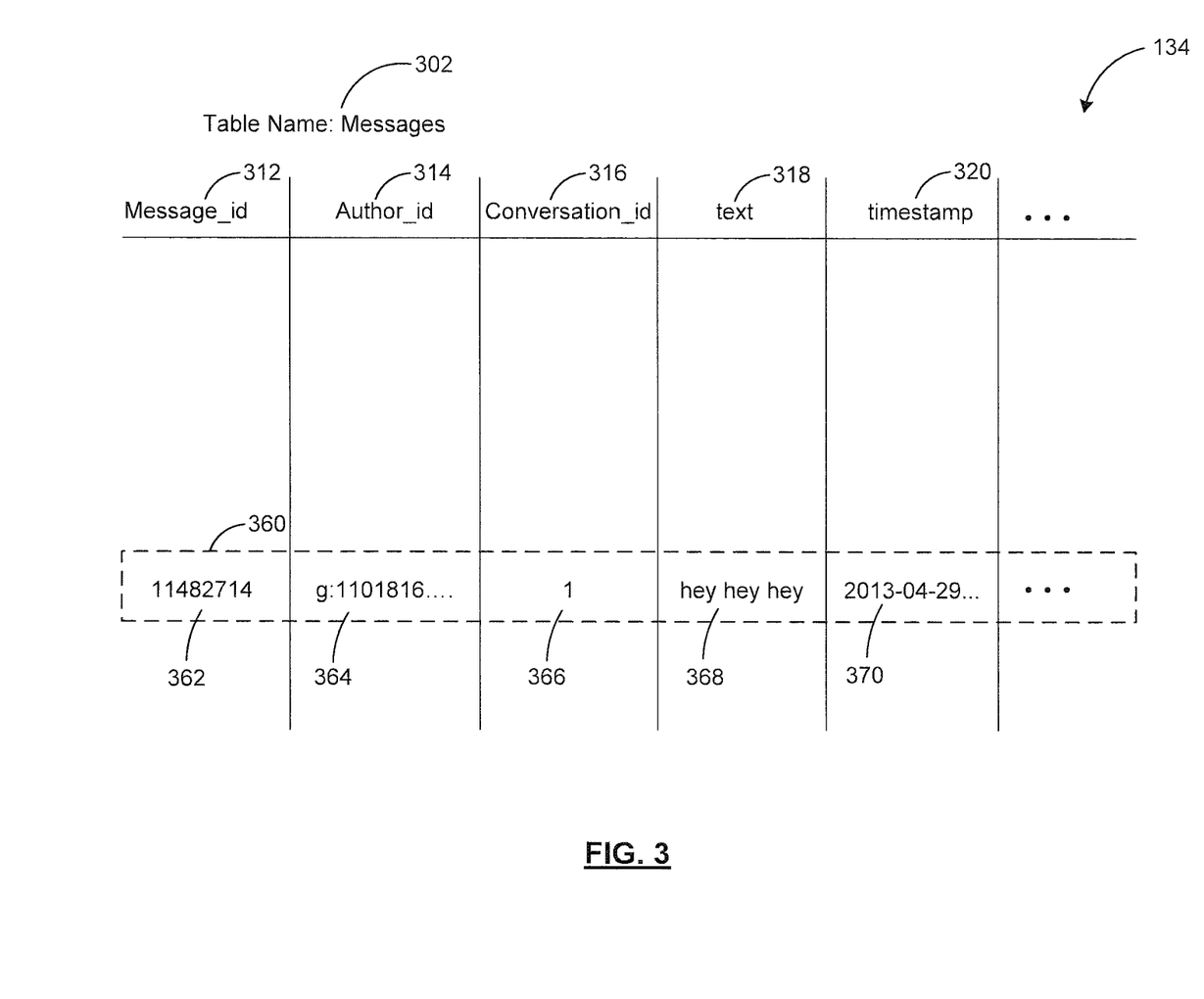
FIG. 3 is an exemplary database table containing data that may be stored in a storage device, in accordance with one example embodiment.

To illustrate step 250, reference is simultaneously made to FIG. 3, which shows generally as 134 a schematic representation of a data table storing unknown data. Data table 134 includes a table identifier 302 (e.g., a table name such as 'Messages' or some other alphanumeric identifier), and a series of columns with respective column identifiers 312, 314, 316, 318, 320.

In the context of step 250 in FIG. 2, a particular column with column identifier 'Message_id' 312 may be being processed. In this context, it may be determined that the column identifier 312 contains the keyword 'message'. Since the column identifier 312 contains a keyword associated with the chat/IM application type, it may be determined that the data in the database of data table 134 belongs to an application of the chat/IM application type.

Returning to FIG. 2, if it is determined that a column identifier does not include a keyword associated with an application type (the 'NO' branch at step 250), then control returns to step 240 where it is again determined whether there are any columns in the table that are still unprocessed.

If it is determined that a column identifier does include a keyword associated with an application type (the 'YES' branch at step 250), then the process has determined that the file includes database information from a particular application type. In a number of situations, a given keyword used to identify data stored in a database as belonging to an application may also be associated with a data field that is commonly used by an application of the particular application type. For example, the keywords 'message', 'subject', 'text', 'msg', 'body' and 'content' may all be commonly used to identify a data field for the substance or "content" of the message in an application of a Chat/IM application type. Similarly, the 'date', 'time', and 'timestamp' keywords may be commonly used to identify a data/time field for the date and time of a message in an application of a Chat/IM application type. Likewise, the keywords 'from', 'sender', 'author', 'uid', and 'member' may be commonly used to identify a data field for the sender of a message in an application of a Chat/IM application type. Further, the keywords 'to', 'receiver', 'conversation', 'recipient', 'partner', 'participant', and 'party' may be commonly used to identify a data field for a recipient of a message in an application of a Chat/IM application type.

As will be understood, there may be other keywords associated with other data fields depending on the nature of the application type that is attempting to be determined. For example, the keywords 'address', 'location', 'URL', or 'visited' may all be commonly used to identify a data field for the address field in a web browser application.

Optionally, to confirm that the determining made at step 250 is correct, at step 255, a data record from the table may be sampled to determine if the data for that column in the data record is consistent with data that would belong (e.g., generated by, or otherwise associated with) to that data field by an application of the application type. This may be performed in a number of ways. For example, in the case where the keyword corresponds to a data field that is supposed to contain the "content" of a message, the data for the data column in the data record may be compared to words in a dictionary that have been previously recognized as commonly being present in the content of a message. For example, these words may include 'hello', 'hi', 'hey', 'bye', 'see', 'you', 'soon' and/or 'later'. In another example, if the keyword corresponds to a data field that is supposed to contain data for the given data field (e.g., a GPS coordinate), a regular expression can be created to recognize a string of text or numeric values as potentially being data of the given data field (e.g., a potential GPS coordinate). In yet another example, heuristics may be developed based on historical experience of what data for a given data field contains, and these heuristics may be used to confirm that data for a given column appears as expected. It will be understood that various other ways of performing this step may be possible.

To illustrate step 255, reference is simultaneously again made to FIG. 3. Data record 360 stored in data table 134 may be sampled to determine whether the data in a particular column of data record 360, such as data 368 for the column with column identifier 'text' 318, is consistent with data that is expected for the data field that the column has mapped to (i.e., the data field for the 'content' of the message). As shown, such data 368 includes the text "hey hey hey". Using the dictionary lookup method described above, it may be determined that since the data 368 includes the word 'hey', the data 368 is consistent with that which is expected for the data field for the "content" of the message (e.g., as that which would have been generated by an application belonging to the Chat/IM application type).

At step 258, if the column maps to a date/time data field, the date/time format for the data of the column may be determined. For example, this may be performed by converting the date/time value to various formats and performing boundary checks to identify the particular date/time format that the data in the column is most likely to be formatted in. Specifically, this may involve converting the data in the column in the sampled data record to each of a plurality of date/time formats; comparing the converted data, in each respective date/time format, to each other to determine which converted data is closest to a reference date/time; and for the converted data that is closest to the reference date/time, identifying the date/time format of the converted data as the date/time format of the data in the column of the table. In various embodiments, the reference date/time may be the present date/time (e.g., the date/time when data recovery process is being performed). Additionally or alternatively, the reference date/time may be a predefined date/time of a particular event (e.g., if data recovery is being performed for forensics purposes, the date/time of a criminal activity such as a murder).

In a variant embodiment, only the post-conversion date/time data that is within a specific date/time window (e.g., +/−7 years of the reference date/time) may be used to compare with each other. This may reduce the amount of comparisons that need to be performed if it is known that it is unlikely that the date/time data that is being sampled will be beyond the specific date/time window. For example, if data converted to a given date/time format results in data that is beyond the specific date/time window (e.g., earlier or later than the window), then it can be determined that such given date/time format is unlikely to be the correct date/time format that the data is actually formatted in.

As will be understood, any date/time format may be supported. For example, some example date/time formats that may be supported include: Unix epoch time—seconds, Unix epoch time—milliseconds, PRTime, Mac Absolute Time, and/or Chrome/webkit time.

Referring still to FIG. 2, if it is determined that the data sampled for the column being analyzed is not consistent with data that would belong to an application of the application type (the 'NO' branch at step 260), then method 200 returns to step 240 where it is again determined whether there are any columns remaining in the table that are still unprocessed.

As indicated above, steps 255 to 260 are optional in that they need not be performed. When they are performed, however, the acts may provide a confirmation that the column with the column identifier having a keyword does in fact corresponds to the data field associated with the keyword. In this way, steps 255 and 260 may be considered a "sanity check" that verifies the conclusion arrived at in step 250.

Referring again simultaneously to FIG. 3, illustrated there are several columns for which the performance of steps 255 to 260 may result in the conclusion arrived at in step 250 not being confirmed. For example, in the column with the column identifier 'Message_id' 312, the determination at step 250 may have been that because the column identifier contains the keyword 'message', that the column corresponds to the data field for the "content" of a message, as would be generated by an application belonging to the Chat/IM application type. However, upon performing steps 255 to 260, it may be determined that the data 362 for that column does not contain any of the words in the dictionary that have been previously recognized as indicating that the data constitutes the "content" of a message. As a result, it may be determined at 260 that the column with the 'Message_id' column identifier 312 does not correspond to the "content" data field of a Chat/IM application. In this way, the performance of steps 255 to 260 may reduce the likelihood of erroneous mappings that are determined based on the results of step 250 alone.

Referring back to FIG. 2, if it is determined that the data sampled for a column is consistent with data that would belong to an application of the application type (the 'YES' branch at step 260), the method 200 proceeds to step 265 where the data stored in the database is identified as belonging to an application of the particular application type identified in step 250. Step 265 may involve the application-type identification module 120 (as shown in FIG. 1) storing information indicating that the unknown data encountered on the storage device 104 belongs to the particular application type for which the unknown data was analyzed (e.g., a Chat/IM application type).

In some cases, application-type identification module 120 may attempt to identify an application identifier (e.g., the name of the application). For example, this may be performed by using operating system application manifests (e.g., as may be separately found on file system 130 of storage device 104, apart from the database 132), or via the text found in file path location (e.g., such text may be found in the file path of where the database 132 is located on the file system 130 of storage device 104). If the application name is available, when performing step 265 in FIG. 2, an association between the name of the application and the application type as identified by the method of FIG. 2 may be stored.

At step 270, a mapping may be stored between the column being processed and the commonly used data field that the sampled data of the column was determined to be consistent with in step 260. In some cases, the mapping may be stored in column/data field mapping store 140. The mappings may, for example, be subsequently referenced when recovering data from the unknown database 132. The mappings may also be subsequently used when recovering data from another storage device 104 containing unknown data, so that if similar database information is encountered, the mappings can be referenced to identify the type of data that is stored in the database.

After step 270, method 200 returns to step 240 to determine whether there are any columns still unprocessed. If method 200 determines that there are no columns still unprocessed, and no tables still unprocessed at step 230, it will return to step 205 where it will continue to search for files. If no files are found in step 210, method 200 may proceed to step 215 and display a mapping user interface that may allow updating of the mapping between a column and a given data field. The mapping user interface may display a list of the located databases tables and mappings of columns of such tables to the commonly used data fields for a given application type, so as to allow user input for final verification or remapping if necessary. A method and user interface for performing such remapping or verification is discussed below with respect to FIGS. 4 and 5.

It will be appreciated that various changes may be made to the method of FIG. 2.

For example, in a variant embodiment, step 265 (to identify data stored in the database as belonging to an application of the particular application type) may be performed immediately after it has been determined that the column identifier 250 includes a keyword associated with the application type, and before a data record is sampled at steps 255 to 260.

Additionally or alternatively, in some embodiments, some of the steps of method 200 may be executed in parallel. Parallel execution of some steps may be desirable in systems that have more than one processor or a processor that has more than one processing core. In such cases, for example, one or more cores may be focused on executing step 250 to identify whether a column identifier contains a keyword associated with an application type, and one or more other cores may be focused on sampling a data record from the table to determine whether the data is consistent with data that would be generated by an application of the application type. Parallel execution may also allow the computing device 102 to process more than one table or more than one column simultaneously.

Further, in some cases, method 200 may also include a step of checking a reference database (e.g., the column/data field mapping store 140 shown in FIG. 1) containing mappings and database information from previous executions of the method of FIG. 2. In such a case, if a match is found between the database being processed and a previously stored mapping, the previously stored mapping may be applied and the data from the database being processed may be automatically recovered to be presented later. In such a case, the method may return directly to step 205 to search for any remaining files that need to be processed, and the mapping need not be presented to the user for verification in accordance with method 400.

Referring to FIG. 4, shown there generally as 400 is a method 400 for updating a mapping between a data field and a column, in accordance with one example embodiment. For ease of illustration, reference will also simultaneously be made to FIG. 5, which shows generally as 500, a screenshot of an example user interface that allows updating of the mapping of a column of a table to a data field commonly used by an application of a particular application type, in accordance with one example embodiment. In various embodiments, the components of the computing device 102, such as the processor 110 and the display 112, may be configured to execute one or more steps of the method 400. In various embodiments, method 400 may be initiated at step 215 of the method 200 of FIG. 2 where a mapping user interface is displayed.

The method 400 starts at step 405 where a mapping between a data field and a column of a table is displayed in a user interface. The mapping may be retrieved from the column/data field mapping store 140 shown in FIG. 1. In various embodiments, the mapping may have been stored as a result of step 270 of method 200 in FIG. 2.

Referring simultaneously to FIG. 5, shown there generally as 500 is an example user interface that may be displayed at step 405 of FIG. 4. As illustrated, the user interface 500 is for an execution of method 200 of FIG. 2 that attempts to determine if unknown data corresponds to a Chat/IM application type. Accordingly, the user interface provides a number of data fields that are commonly used by an application of a Chat/IM application type. Specifically, there is a 'sender' data field 514 (shown in FIG. 5 with the text "Identified Sender Column"), a 'recipient' data field 516 (shown in FIG. 5 with the text "Identified Recipient Column"), a 'content' data field 518 (shown in FIG. 5 with the text "Identified Message Column"), and a 'date/time' data field 520 (shown in FIG. 5 with the text "Identified Date Column").

The user interface 500 of FIG. 5 shows, as rows, each of the tables 134 that have been processed in FIG. 2. For each table 134, the user interface shows the column identifier of a column in the table that has been determined to be mapped to a particular data field 514, 516, 518, 520 for the application type. For example, the user interface 500 shows information for the database table 134 illustrated in FIG. 3. Referring simultaneously to FIG. 3, it can be seen that the mapping (e.g., as may have been stored at step 270 in FIG. 2) has determined that the column with column identifier 'author_id' 314 corresponds to the 'sender' data field 514. Similarly, the column with column identifier 'conversation_id' 316 has been determined to correspond to the 'recipient' data field 516, the column with column identifier 'timestamp' 320 has been determined to correspond to the 'date/time' data field 520, and the column with the column identifier 'text' 318 has been determined to correspond to the 'content' data field 518.

As illustrated, the user interface 500 may also display the determined application identifier 530 for a given table 134 (e.g., "com.google.android.apps.plus") and the table identifier 535 for a given table 134 (e.g., the table name "messages" 302) if such information is available and has been determined.

As discussed above, for a column that is identified as corresponding to the 'date/time' data field 520, it may be possible to determine the date/time format of the data stored for that column. Accordingly, in some embodiments, if a given column has been mapped to a 'date/time' data field, the determined date/time format of the data may also be shown in the user interface 500. As illustrated, this is provided as an additional column 550 positioned beside the 'date/time' field 520. For the database table 134 of FIG. 3, for example, the user interface 500 shows that the data for the column with the column identifier 'timestamp' 320 as being determined to be of a 'PRTime' date/time format 555.

Furthermore, user interface 500 has a preview section 560 that displays how the data from a data record of the table would be presented, based on the mappings. For example, the data record 360 illustrated in FIG. 3 may be shown in the preview section 560 according to the mappings illustrated for the database table 134. Referring again simultaneously to FIG. 3, it can be seen that the data 364 for the 'Author_id' column 314 is provided under 'From' in the preview section 560 because the 'Author_id' column 314 is mapped to the 'sender' data field 514. Similarly, the data 366 for the 'Conversation_id' column 316 is provided under 'To' in the preview section 560 because the 'Conversation_id' column 316 is mapped to the 'recipient' data field 516. Likewise, the data 368 for the 'text' column 318 is provided under 'Message' in the preview section 560 because the 'text' column 318 is mapped to the 'content' data field 518, and the data 370 for the 'timestamp' column 320 is provided under 'Date/Time' in the preview section 560 because the 'timestamp' column 320 is mapped to the 'date/time' data field 520.

For the date/time data 370, the preview section 560 may be configured to display the data according to the date/time format that has been determined in the method of FIG. 2 above. For example, as illustrated, because the date/time format of the date/time data 370 has been determined to be 'PRTime' (e.g., as illustrated at 555 of user interface 500), the date/time shown would be the date/time data 370 after it has been converted to the 'PRTime' format. If the resultant post-conversion date/time data appears to be incorrect in the preview section 560 to a user, user input may be received via the user interface control 555 (e.g., the indicated combo box may be selected), and an alternative date/time format may be chosen. The preview section 360 may then be updated to display the date/time data formatted according to the alternative date/time format.

Referring back to FIG. 4, at step 410, input from the user interface may be received indicating that a data field is to be mapped to an alternative column of the table. As illustrated in FIG. 5, the various mappings of the column identifiers 314, 316, 318, 320 of data table 134 are provided within drop-down controls that may receive such input selecting an alternative column of the table to map to the particular data field 514, 516, 518, 520. Specifically, the list within the drop down box may be populated with all the column identifiers of the other columns of the table, so that other column identifiers for the table may be selected to be mapped to a given data field 514, 516, 518, 520.

The drop-down boxes may be activated if a user determines that a given mapping is incorrect. For example, upon seeing that the 'recipient' data field 516 being mapped to the column with the 'conversation_id' column identifier results in the number '1' being identified as a recipient of message in a Chat/IM application (e.g., as is illustrated in under 'To' in the preview section 560), the user may select an alternative column to be mapped to the 'recipient' data field 516.

In various embodiments, in response to receiving user input indicating an alternative mapping, the preview section 560 may be updated to correspond to the alternative mapping. In some instances the preview section 560 may be updated to allow the user to consider whether the selected mapping is appropriate, or whether the mapping should be changed again.

Referring again to FIG. 4, at step 415, an updated mapping for the data field to the alternative column may be stored. For example, the processor 110 may update the mapping stored in column/data field mapping store 140 to correspond to the alternative column. In some cases, method 400 may be executed multiple times for an application before the user has determined the appropriate mapping for that application.

Referring now to FIG. 6, illustrated therein generally as 600 is a screenshot of a data recovery user interface after the updating of the mapping of a column of a table to a data field commonly used by an application of a particular application type, in accordance with one example embodiment.

Once a user has completed their review of the mappings for the identified applications, the computing device 102 may attempt to recover the data from the respective unknown databases, using the stored mappings. For example, the computing device 102 may generate a report or case file that contains the results of the data extracted using the stored mappings. In various embodiments, the data recovery user interface 600 may be displayed after the mapping has been updated according to the method 400 of FIG. 4. Additionally or alternatively, the data recovery interface 600 may also be presented to a user immediately after the initial mappings are stored upon the completion of the method 200 of FIG. 2.

As illustrated, a number of different tables 134 that have been analyzed may be selected in the left-hand pane. Upon selection of a given table (e.g., as illustrated, a table for the application with the "com.google.android.apps.plus" application identifier), the records for that table can then be populated into the top-right pane (e.g., as illustrated, there are 43 data records within the table). The data within each of the data records are then displayed in accordance with the mapping determined by method 200 of FIG. 2 and/or method 400 of FIG. 4. For example, for the column in each table that has been mapped to the 'sender' data field 514, the 'recipient' data field 516, the 'content' data field 518, and the 'date/time' data field 520 respectively, the data contained therein for each data record are shown under each respective data field 514, 516, 518, 520.

The user interface 600 also includes a preview section 660 which displays a preview of how the data of a selected data record 360 would appear based on the mappings. As illustrated, the example data record 360 shown in FIG. 3 is again shown. For example, the data 364 for the 'Author_id' column 314 is shown as being associated with the 'sender' data field 514. Similarly, the data 366 for the 'Conversation_id' column is shown as being associated with the 'recipient' data field 516. Likewise, the data 368 for the 'text' column 318 is shown as being associated with the 'content' data field 518, and the data 370 for the 'timestamp' column 320 is shown as being associated with the 'date/time' data field 520. Additionally, the preview section 660 may also provide an indication of the table identifier 302 (e.g., the table name 'messages').

While the above description provides examples of one or more devices, systems and methods, it will be appreciated that other devices, systems and methods may be within the scope of the present description interpreted by one of skill in the art.

As noted, the systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that acts and the order of the acts performed in the processing described herein may be altered, modified and/or augmented yet still achieve the desired outcome.

In particular, the steps of a method in accordance with any of the embodiments described herein may be performed in any order, whether or not such steps are described in the claims, figures or otherwise in any sequential numbered or lettered manner. Also, in the various user interfaces illustrated in the figures, it will be understood that the illustrated user interface text and controls are provided as examples only and are not meant to be limiting. Other suitable user interface elements may be possible.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

The invention claimed is:

1. A method of identifying unknown data associated with a forensic event according to reference time data, the method comprising:
    storing reference time data corresponding to the forensic event;
    accessing data from a data storage device comprising unknown data of an unknown application type;
    determining that the unknown data is suggestive of a database source, based on the unknown data comprising at least one table with at least one column;
    in response to determining that the unknown data is suggestive of a database source, for a column of a table in database information of the unknown data:
        determining if a column identifier of the column comprises a keyword associated with a particular application type;
        retrieving a content sample data record that is within the column;
        determining if a subset of the content sample data record matches dictionary data, the dictionary data predetermined based on expected content associated with the particular application type;
        if the column identifier comprises the keyword, identifying data stored in the database information as stored by an application that is of the particular application type by:
            converting the data in the column in the data record to each of a plurality of date/time formats to obtain converted data;

comparing the converted data, in each respective date/time format, to each other to determine which converted data is closest to the reference time data; and for the converted data that is closest to the reference time data, identifying the date/time format of the converted data as the date/time format of the data in the column of the table.

2. The method of claim 1, wherein the keyword is associated with a data field that is commonly used by an application of the particular application type.

3. The method of claim 2, wherein prior to identifying the data stored in the database information as belonging to an application that is of the particular application type, the method further comprises:

sampling a data record in the table; and determining that data for the column in the data record is consistent with data for the data field that would belong to an application of the particular application type.

4. The method of claim 2, wherein the method further comprises:

storing a mapping between the data field and the column, the mapping being accessible during recovery of data in the database to indicate that data for the column in the table is associated with the data field.

5. The method of claim 4, further comprising:

displaying the mapping between the data field and the column in a user interface, wherein the user interface provides an option to select an alternative column of the table to be mapped to the data field;

receiving input indicating that the data field is to be mapped to the alternative column; and storing an updated mapping for the data field, the updated mapping indicating that the data field is mapped to the alternative column.

6. The method of claim 2, wherein the particular application type comprises a messaging application, and the data field that is commonly used comprises one of: a sender field, a recipient field, a message field, and a timestamp field.

7. The method of claim 2, wherein the particular application type comprises a web browser application, and the data field that is commonly used comprises one of: an address field, a date field, a bookmark field, and a title field.

8. The method of claim 2, wherein the particular application type comprises a geographic location-enabled application, and the data field that is commonly used comprises one of: a longitude field, a latitude field, a destination field, a direction field, and a route field.

9. The method of claim 1, wherein the particular application type comprises a messaging application, and the keyword comprises one of the following words: message, subject, text, msg, body, content, date, time, timestamp, from, sender, author, uid, member, to, receiver, conversation, recipient, partner, participant, and party.

10. The method of claim 1, wherein the particular application type comprises a web browser application, and the keyword comprises one of the following words: address, location, loc, URL, visited, date, bookmark, favorite and title.

11. The method of claim 1, wherein the particular application type comprises a geographic location-enabled application, and the keyword comprises one of the following words: coordinate, longitude, latitude, location, loc, home, destination, direction, and route.

12. A computing device comprising a processor and a non-transitory computer readable memory storing instructions which, when executed by the processor, cause the processor to perform the method as claimed in claim 1.

13. A non-transitory computer readable medium comprising instructions which, when executed by a processor, cause the processor to perform the method as claimed in claim 1.

14. A method of identifying unknown data associated with a forensic event according to reference time data, the method comprising:

storing reference time data corresponding to the forensic event;

accessing data from a data storage device comprising unknown data of an unknown application type;

determining that the unknown data is suggestive of a database source, based on the unknown data comprising at least one table with at least one column;

in response to determining that the unknown data is suggestive of a database source, for a column of a table in database information of the unknown data:

determining if a column identifier of the column comprises a keyword associated with a particular application type;

retrieving a content sample data record that is within the column;

determining if a subset of the content sample data record matches dictionary data, the dictionary data predetermined based on expected content associated with the particular application type;

if the column identifier comprises the keyword, identifying data stored in the database information as stored by an application that is of the particular application type by:

converting the data in the column in the data record to each of a plurality of date/time formats to obtain converted data;

flagging converted data entries of the converted data that are greater than a threshold time away from the reference time data;

comparing the converted data entries in the converted data that are unflagged, in each respective date/time format, to each other to determine which of the converted data entries is closest to the reference time data; and for the converted data entry that is closest to the reference time data, identifying the date/time format of the converted data entry as the date/time format of the data in the column of the table.

15. The method of claim 14, wherein the date/time format comprises any one of: Unix epoch time—seconds, Unix epoch time—milliseconds, PRTime, Mac Absolute Time, and/or Chrome/webkit time.

16. A device comprising at least one processor configured to perform the method of claim 14.

* * * * *